US008624150B2

(12) United States Patent
Simek et al.

(10) Patent No.: US 8,624,150 B2
(45) Date of Patent: Jan. 7, 2014

(54) ADAPTER FOR A PLASMA ARC TORCH

(75) Inventors: Richard Joseph Simek, New London, NH (US); Jonathan Mather, Cornish, NH (US); Peter J. Twarog, West Lebanon, NH (US); Stephen Theodore Eickhoff, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 414 days.

(21) Appl. No.: 12/878,512

(22) Filed: Sep. 9, 2010

(65) Prior Publication Data

US 2012/0061355 A1   Mar. 15, 2012

(51) Int. Cl.
 *H05H 1/34* (2006.01)
 *B23K 10/00* (2006.01)
(52) U.S. Cl.
 USPC ............ 219/121.53; 219/121.52; 219/121.48; 219/121.51; 219/75
(58) Field of Classification Search
 CPC ............ B23K 10/00; H05H 1/34; H05H 1/26
 USPC ............... 219/121.39, 121.45, 121.5, 121.52, 219/121.48, 121.59, 74, 75; 313/231.41, 313/231.51; 315/111.21
 See application file for complete search history.

(56) References Cited

U.S. PATENT DOCUMENTS

| | | | |
|---|---|---|---|
| 4,791,266 A * | 12/1988 | Gerard | 219/121.48 |
| 4,791,268 A | 12/1988 | Sanders et al. | |
| 5,039,837 A | 8/1991 | Nourbakhsh et al. | |
| 5,132,513 A * | 7/1992 | Ingwersen et al. | 219/137.31 |
| 5,208,441 A | 5/1993 | Broberg | |
| 5,260,546 A | 11/1993 | Ingwersen et al. | |
| 5,328,516 A | 7/1994 | Dietiker | |
| 5,338,917 A | 8/1994 | Stuart et al. | |
| 5,451,740 A * | 9/1995 | Hanus et al. | 219/121.59 |
| 5,624,586 A | 4/1997 | Sobr et al. | |
| 5,683,599 A | 11/1997 | Ellis | |
| 6,078,023 A | 6/2000 | Jones et al. | |
| 6,163,008 A | 12/2000 | Roberts et al. | |
| 6,365,867 B1 | 4/2002 | Hooper | |
| 6,713,711 B2 | 3/2004 | Conway et al. | |
| 7,429,715 B2 | 9/2008 | MacKenzie et al. | |
| 2003/0052095 A1 | 3/2003 | Sanders et al. | |
| 2003/0091383 A1* | 5/2003 | Conway | 403/348 |
| 2003/0160032 A1 | 8/2003 | Mackenzie et al. | |
| 2005/0061784 A1 | 3/2005 | Matus | |

(Continued)

FOREIGN PATENT DOCUMENTS

| | | |
|---|---|---|
| EP | 0079019 | 5/1983 |
| EP | 2 255 916 | 12/2010 |
| WO | 03/024655 | 3/2003 |

*Primary Examiner* — Mark Paschall
(74) *Attorney, Agent, or Firm* — Proskauer Rose LLP (57) ABSTRACT

An apparatus and method for extending a plasma arc torch is disclosed. The apparatus includes a plasma torch adapter for relocating a mounting location of plasma torch consumables with respect to a plasma arc torch. The adapter is configured to be mounted between a plasma arc torch and the plasma torch consumables. The adapter is connectable to a consumable interface of the torch and includes a generally longitudinal body having a first end and a second end. The adapter includes a first connector at the first end of the body that is adapted to mate with the consumable interface. The adapter further includes a second connector at the second end of the body for mating with a set of plasma torch consumables, such that a second mounting location for consumables is established in a spaced relationship relative to the first connector, the mounting location adjacent the second connector.

19 Claims, 6 Drawing Sheets

(56) References Cited

U.S. PATENT DOCUMENTS

| | | |
|---|---|---|
| 2007/0082532 A1 | 4/2007 | Morris |
| 2009/0039059 A1* | 2/2009 | Twarog et al. ............ 219/121.44 |
| 2010/0294744 A1* | 11/2010 | Hewett et al. ............ 219/121.48 |
| 2012/0292296 A1* | 11/2012 | Griffin .................... 219/121.52 |

* cited by examiner

ADAPTER FOR A PLASMA ARC TORCH

TECHNICAL FIELD

The present invention relates to an adapter for extending a plasma arc torch.

BACKGROUND

Plasma arc torches are used in the cutting and marking of metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. Gases used in the torch can be non-reactive (e.g., argon or nitrogen), or reactive (e.g., oxygen or air). The torch produces a plasma arc, which is a constricted ionized jet of a plasma gas with high temperature and high momentum.

Though most plasma arc torches share the same basic operation, the consumables used to operate plasma arc torches vary widely. Some plasma arc torches employ translating electrodes in order to initiate the plasma arc, while others use start-cartridges for the same purpose. Still other plasma torches use high frequency start circuits to initiate the plasma arc. There are, of course, many other variations from plasma torch design to plasma torch design, including differently designed nozzles, swirl rings, shields. While the various designs each have advantages and disadvantages, it is often troublesome for a user who owns multiple types of plasma cutting machines to carry the variety of consumables needed to operate all the machines.

Furthermore, hand-held torches are now being used in ever more intricate situations, including those where access to portions of the workpiece can be difficult. Automated (mechanized) torches are being used to cut special shapes, including cuts having bevel surfaces. One way to make such cuts is to angle the torch head, such that the plasma arc emitted from the torch is not perpendicular with a planar workpiece that is being cut. Expensive and extensive automated systems have been manufactured with devices to automatically rotate torches to perform bevel cuts.

Most hand-held plasma cutting torches have a torch head that is fixed at an angle between about 90° and about 115° relative to the handle. While this configuration is well suited for many cutting applications it is not ideal for cutting into sharp corners or pockets and many gouging applications. While a straight torch with a trigger may be easy to manufacture, it would be limited to these relatively infrequent applications.

SUMMARY OF THE INVENTION

What is needed is an adapter that quickly converts a standard torch into an extended or angled torch that would allow users to cut and gouge in many different applications without changing torch leads. An extended adapter would be especially beneficial in gouging applications where hot molten metal blown from the plate can damage the torch handle and cause the user discomfort. The extender can move the handle and controls farther away from the arc and extend the life of the torch in severe applications.

It may also be desirable to have an adapter that can convert a plasma arc torch that uses one type of consumable into a plasma arc torch that uses a second type of consumable. This type of adapter can take advantage of cutting, cost, or performance features that the native consumables do not possess.

The invention, in one aspect, features a plasma torch adapter for relocating a mounting location of plasma torch consumables with respect to a plasma arc torch. The plasma torch adapter is configured to be mounted between a plasma arc torch and plasma torch consumables. The plasma torch adapter is connectable to a consumable interface of the plasma arc torch. The adapter includes a generally longitudinal body including a first end and a second end. The adapter also includes a first connector at the first end of the body. The first connector is adapted to mate with the consumable interface of the plasma arc torch. The adapter further includes a second connector at the second end of the body for mating with a set of plasma torch consumables, such that a second mounting location for consumables is established in a spaced relationship relative to the first connector, the second mounting location adjacent the second connector.

In some embodiments, the consumable interface accommodates consumables having a first mounting topology. The second connector can accommodate consumables having a second mounting topology.

In some embodiments, the plasma torch adapter also includes a sensor that prevents operation of the torch if a consumable is not mounted at the mounting location. The sensor can pass through the body of the plasma torch adapter. In some embodiments, the sensor detects the presence of consumables mounted at the second mounting location.

In some embodiments, the adapter includes an adapter sensor mechanism that relocates a functionality of a torch sensor to the second mounting location of the adapter. For example, the torch sensor mechanism can be a button that is located at the consumable interface of the plasma arc torch. The functionality of the button (e.g., its ability to detect when a consumable is properly mounted at the mounting location), can be moved to the adapter by employing, for example, a translating rod. The translating rod can span the entire length of the adapter, for example, from the first end to the second end of the adapter. When the translating rod is depressed at the second mounting location by a consumable, the rod also depresses the sensing button at the consumable interface of the plasma arc torch. In this way, the functionality of the adapter sensor mechanism can be relocated from the consumable interface of the plasma arc torch to the second mounting location of the adapter.

In some embodiments, the first connector receives a first set of functionalities from the plasma arc torch and the second connector transmits a second set of functionalities to the set of plasma torch consumables. The second set of functionalities can include at least the first set of functionalities. In some embodiments, the second set of functionalities does not include all functionalities of the first set of functionalities. For example, the functionalities can correspond to the mechanical designs required to achieve the desired cutting current, plasma gas, shield gas, or cooling fluid. For example, the functionality of the plasma arc torch can include a translating or blowback contact start-electrode or can include an un-shielded nozzle.

The body of the plasma torch adapter can further include at least two electrical paths from the second end of the body to the first end of the body.

In some embodiments, a gas flow of the plasma arc torch is modified by the plasma torch adapter.

The body of the plasma torch adapter can have a starting mechanism for contact starting a plasma arc. For example, the starting mechanism can include a spring.

In some embodiments, a central axis of the second connector is located at an angle of about 0° to about 180° relative to a central axis of the first connector.

The body of the plasma torch adapter can be at least one of flexible or positionable. The second connector can be configured to connect to a second plasma torch adapter. For example, multiple plasma torch adapters can be connected to form a chain of plasma torch adapters.

In some embodiments, the plasma arc torch is a handheld plasma arc torch.

The consumable interface and the second connector can be complementary.

In some embodiments, the adapter is securable to the consumable interface to prevent rotation of the adapter relative to the torch. The adapter can have a gas input that is separate from a gas input from the plasma arc torch. The plasma torch consumables and the set of plasma torch consumables can be the same.

The invention in another aspect features a method of modifying a plasma arc torch that receives a first plasma arc consumable set having a first mounting topology to receive a second consumable set having a second mounting topology. The method includes positioning an adapter for extending the plasma arc torch between the plasma arc torch and the second consumable set. The adapter is connectable to a consumable interface of the plasma arc torch. The method also includes aligning a first connector of the adapter with the consumable interface of the plasma arc torch. The method further includes securing the first connector of the adapter to the consumable interface of the plasma arc torch. The method also includes aligning the second consumable set having the second mounting topology with the second connector of the adapter. The second connector of the adapter is secured to the second consumable set.

In some embodiments, the method further includes removing the first consumable set having the first mounting topology from the first consumable interface of the plasma arc torch.

The invention in another aspect features a plasma torch adapter for extending a plasma arc torch. The plasma torch adapter is configured to be mounted between a plasma arc torch and plasma torch consumables. The plasma torch adapter is connectable to a consumable interface of the plasma arc torch. The adapter includes a generally longitudinal body including a first end and a second end. The plasma torch adapter also includes a first connector at the first end of the body. The first connector is adapted to receive a gas input and cutting current from the plasma arc torch. The adapter further includes a second connector at the second end of the body for passing a gas output and a cutting current to plasma torch consumables, such that a mounting location for the consumables is established in a spaced relationship relative to the first connector, the mounting location adjacent the second connector.

The body can comprise a starting mechanism for contact starting a plasma arc. For example, the starting mechanism can include a spring. In some embodiments, the body of the adapter is positionable such that a central axis of the second connector is located at an angle of about 0° to about 180° relative to a central axis of the first connector.

BRIEF DESCRIPTION OF THE DRAWINGS

The foregoing and other objects, features and advantages of the invention, as well as the invention itself, will be more fully understood from the following illustrative description, when read together with the accompanying drawings which are not necessarily to scale.

DETAILED DESCRIPTION

An adapter and/or extender that easily couples with a plasma torch can allow operators to alter the consumable receptacle to enable different consumables to be used with the torch or alter the torch configuration to facilitate different applications. Consumable adapters can convert from one type of consumable to another. Application adapters can alter the torch angle and standoff to allow the operator to cut and gouge in areas not easily accessible with a conventional torch. An adapter designed to mate with an existing torch on one end, and a duplication of the normal torch/consumable interface on the other end, can make it simple and convenient for the operator to attach or remove the adapter as needed. The adapter can also be designed to work with the cap sensing safety switch used on many torches by mechanically translating the movement of the consumable cap back to the torch switch. Because the front of the adapter can be designed to copy the torch/consumable interface, the operator can couple several adapters together to significantly extend the reach of the torch.

Figure 1:
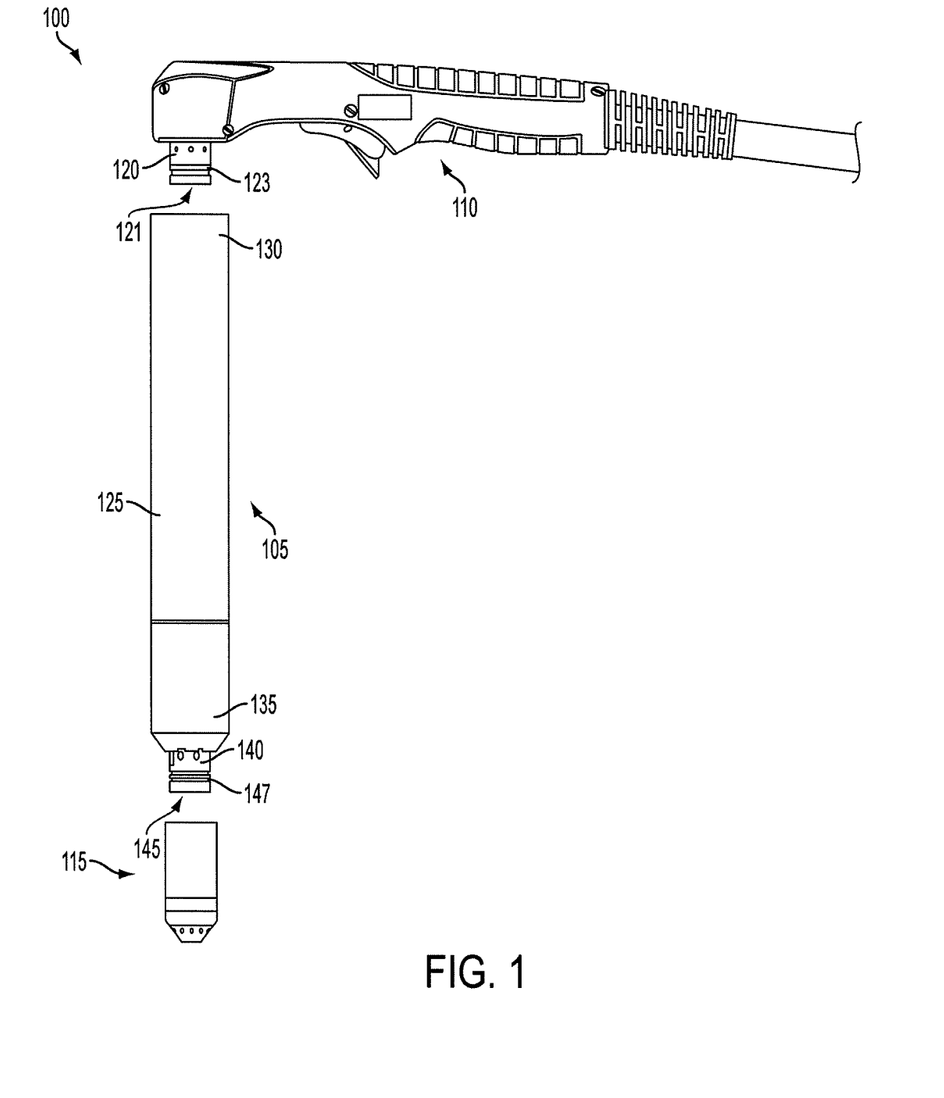
FIG. 1 is a side view of a plasma arc torch adapter for extending a plasma arc torch, according to an illustrative embodiment of the invention.

One aspect of the invention features a plasma torch adapter for extending a plasma arc torch. The plasma torch adapter relocates a mounting location of plasma torch consumables with respect to a plasma arc torch. FIG. 1 is a side view of a plasma arc torch system 100, including a plasma arc torch adapter 105 for extending a plasma arc torch 110, according to an illustrative embodiment of the invention. The adapter 105 is configured to be mounted between the plasma arc torch 110 and plasma torch consumables 115. The consumables 115 can include, for example, an electrode, a nozzle, a retaining cap, shield, or a swirl ring. The plasma torch adapter 105 is connectable to a consumable interface 120 of the plasma arc torch 110, for example, by threads 123. When the plasma torch adapter 105 is not being used to extend the plasma arc torch 110, the consumable set 115 is connected directly to the consumable interface 120.

The plasma arc torch 110 can be a mechanized torch, a manual torch, or a table-mounted manual torch. The plasma torch adapter 105 can be used to extend each type of torch in substantially the same way.

The plasma torch adapter 105 includes a generally longitudinal body 125 that has a first end 130 and a second end 135. A first connector (not shown) is located at the first end 130 of the generally longitudinal body 125. The first connector is adapted to mate with the consumable interface 120 of the plasma arc torch 110.

The first connector can be located inside the first end 130 of the body 125, for example, the first connector can be threads that can be connected to the threads 123 of the consumable interface 120. The first connector can be any other connecting mechanism that allows the plasma torch adapter 105 to mate with the plasma arc torch 110, and more specifically, to the consumable interface 120.

The plasma torch adapter 105 also includes a second connector 140 at the second end 135 of the generally longitudinal body 125. The second connector 140 can mate with the plasma torch consumables 115, for example by threads 147. A second mounting location 145 for the consumables 115 is established in a spaced relationship relative to the first connector. The second mounting location 145 is adjacent to the second connector 140.

The plasma torch adapter 105 is used to relocate a mounting location 121 of plasma torch consumables with respect to the plasma arc torch 110. For example, when the plasma torch adapter 105 is not being used, the consumables are mounted at the mounting location 121 of the consumable interface 120 on the plasma arc torch 110. When the plasma torch adapter 105 is being used, the adapter 105 is mounted at the mounting location 121 of the consumable interface 120 and the consumables are mounted at the second mounting location 145 of the plasma torch adapter 105. In this way, the plasma torch adapter 105 has relocated a mounting location of plasma torch consumables, e.g., the mounting location of the consumables was relocated from mounting location 121 to the second mounting location 145.

In some embodiments, the consumable interface 120 accommodates consumables having a first mounting topology and the second connector 140 accommodates consumables having a second mounting topology. For example, the consumable interface 120 can accommodate consumables that are made by the same company that manufactures the plasma arc torch 110. When the adapter 105 is mated with the plasma arc torch 110, the mounting topology of the second connector 140 can accommodate consumables that are made by a different company.

In addition, the different mounting topologies of the consumable interface 120 and second connector 140 of the plasma torch adapter 105 can allow an older torch to use newer consumables. For example, a relatively short adapter (e.g., about 1 inch) could be used to convert older systems or competitive systems to new consumables without replacing the existing torch and leads. Furthermore, a variety of torch mating receptacles (for example, the first connector located at the first end 130 of the adapter 105) could be designed to enable several types of torches to receive the same type of consumable.

In some embodiments, the adapter 105 is an extender. The second connector 140 can have the same mounting topology as the consumable interface 120 (i.e., the first consumable interface 120 and the second connector 140 are complementary). This configuration can be used to extend the plasma arc torch and create a consumable mounting location at a spaced relationship from the plasma arc torch 110. This can allow the handle and controls to be further away from the plasma arc, thus extending the life and/or the reach of the plasma arc torch 110.

In addition, since the mounting topology of the second connector 140 and the consumable interface 120 can be the same, multiple adapters can be installed end to end to significantly increase the reach or length of the plasma arc torch 110.

For example, the second connector 140 can be configured to connect to a second plasma arc torch adapter. This can be particularly beneficial in severe applications. The ability to use multiple adapters to extend a plasma arc torch can also allow the user to customize the length of the adapter. For example, different size adapters can be installed end to end to create a customized length. The size of the individual adapters can range from about 1 inch to about 12 inches. In some embodiments, the size of the individual adapters are greater than 12 inches.

In some embodiments, the consumable interface 120 has a first set of functionalities. The functionalities can correspond to the mechanical designs required to achieve the desired cutting current, plasma gas, shield gas, or cooling fluid. For example, the functionality of the plasma arc torch can include a translating or blowback contact start-electrode or can include an un-shielded nozzle. Therefore, the consumable interface 120 can be designed to operate with a specific design to accommodate the desired cutting current and plasma gas. The second connector 140 can have a second set of functionalities. The second set of functionalities can include at least the first set of functionalities. For example, if the consumable interface 120 is designed to operate with a translating or blowback contact start electrode, the second connector 140 can be designed to accommodate the same. Thus, functionality of the consumable interface 120 can be displaced from a first location to a second location (e.g., from the first mounting location to the second mounting location or from the first connector to the second connector).

The second set of functionalities of the second connector 140 can also be designed to contain a different set of functionalities than the first set of functionalities of the consumable interface 120. For example, if the torch 110 and consumable interface 120 are designed to operate with a translating or blowback contact start electrode, the second connector 140 can accommodate an electrode with an integral spring or set of consumables using a start cartridge, respectively. Thus, the functionality of the second connector 140 of the adapter 105 is different than the functionality of the consumable interface 120 of the torch. In order to accommodate different functionalities, a mechanical interface at the second connector 140 can be different than a mechanical interface at the consumable interface 120. For example, consumable interface 120 can include a plunger (not shown) that is integral with the torch 110, but the second connector 140 can omit such a spring. This allows the operator to have greater flexibility with a single plasma arc torch. A single torch can accommodate a variety of currents, plasma gases, shield gases, or cooling gases, for example.

Figure 2:
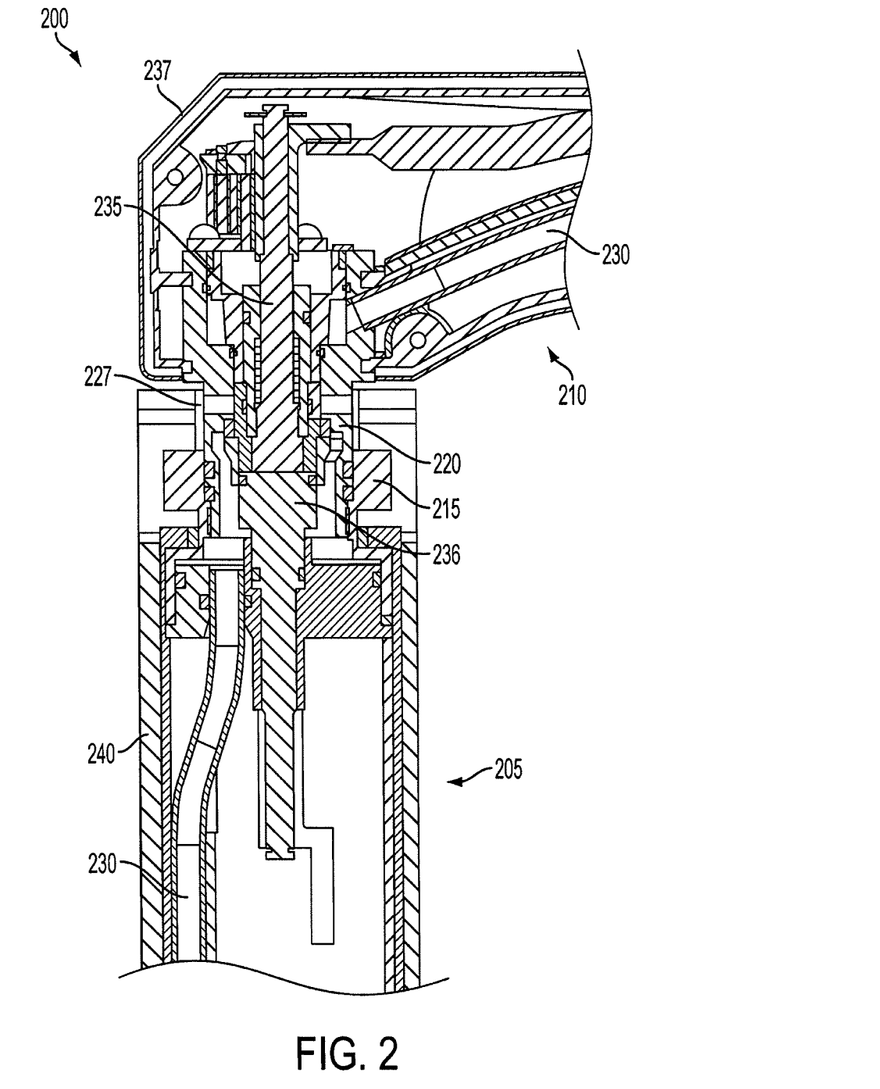
FIG. 2 is a cross sectional view of a plasma arc torch adapter connected to a plasma arc torch, according to an illustrative embodiment of the invention.
Figure 3:
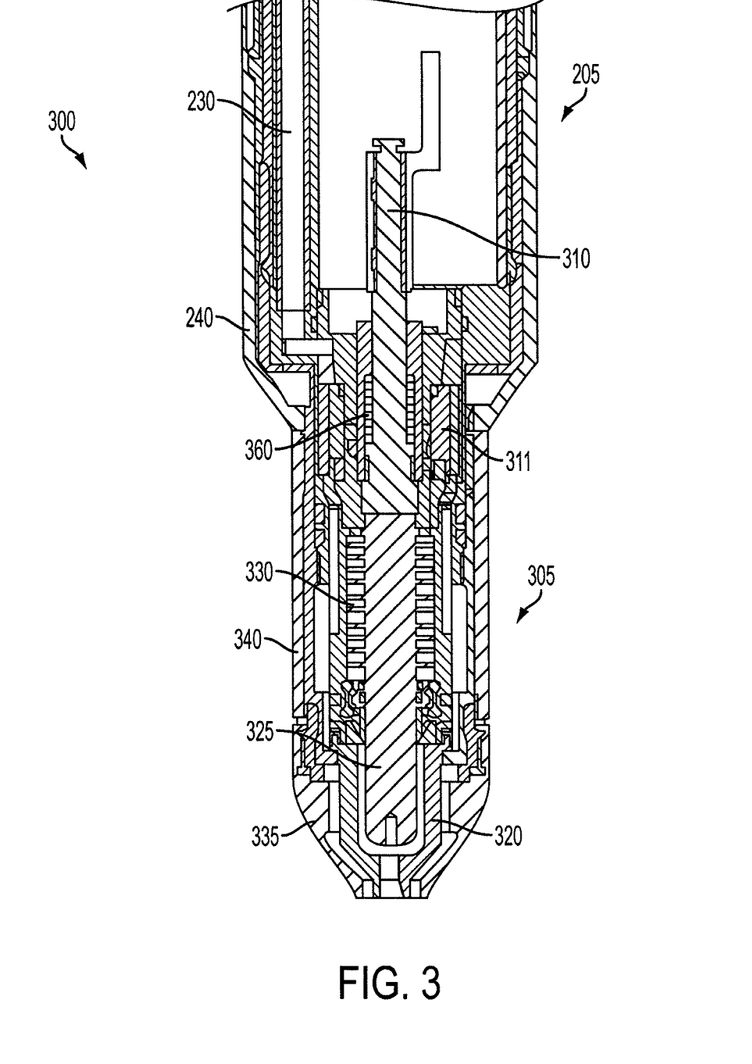
FIG. 3 is a cross sectional view of a plasma arc torch adapter connected to a consumable set, according to an illustrative embodiment of the invention.

FIG. 2 is a cross sectional view of a plasma arc torch system 200 including plasma arc torch adapter 205 connected to a plasma arc torch 210, according to an illustrative embodiment of the invention. FIG. 3 is a cross sectional view of a plasma arc torch system 300 including plasma arc torch adapter 205 connected to a consumable set 305, according to an illustrative embodiment of the invention. The adapter 205 shown in FIGS. 2 and 3 can be designed using known plunger style contact start technology, having an upper plunger 235 of the torch head 237, an upper plunger 236 of the adapter 205 and a lower plunger 310 of the adapter 205. The lower plunger 310 of the adapter 205 can mate with the electrode 325.

However, the adapter can also be made using the stationary power contact design, which would make it possible to reduce the diameter of the adapter. The adapter can translate these known starting techniques over the length of the adapter. Therefore, no new starting techniques or mechanisms are required and the torch with the adapter operates in substantially the same way as the torch without the adapter. This allows operators to easily transition between using a torch with an adapter and using a torch without an adapter because no new starting techniques need to be learned.

As shown in FIG. 2, the consumable interface 220 of the plasma arc torch 210 is mated with the first connector 215 of the plasma arc torch adapter 205. For example, the plasma arc torch adapter 205 can mate with the plasma arc torch 210 by screwing the plasma arc torch adapter 205 to the plasma arc torch 210 using threads 227. As shown in FIG. 3, the second connector 311 of the plasma torch adapter 205 is mated with the consumable set 305.

In some embodiments the body the plasma arc torch contains at least two electrical paths from the second end of the body to the first end of the body. The electrical paths, for example, a power wire (not shown), can run inside the adapter 205 connecting the two terminals (e.g., the power wire can run through the adapter 205 to connect the plasma arc torch 210 and the consumable set 305) and looped in a way to allow the lower plunger 310 to move. The electrical paths can be for current flow, torch operation, or safety signals, for example. The adapter can also include a pilot wire for completing the pilot circuit between the consumables and the power supply (not shown). The lower torch body of the adapter 205 shown in FIG. 3 can be similar to machine torch bodies that are currently being used but with a longer gas tube, for example, gas tube 230. The longer tube can be used to keep the gas volume of the adapter as small as possible, to maintain responsive torch starting. In some embodiments, the gas flow of the plasma arc torch can be modified by the adapter. For example, gas flow dynamics can be adjusted and modified.

The first connector 215 can be adapted to receive a gas input and cutting current from the plasma arc torch 210. For example, the first connector 215 can receive gas input tube 230. The gas input and cutting current run from the plasma arc torch 210, through the adapter 205 and continue to the consumables.

Referring to FIG. 3, the consumable set 305 can includes a nozzle 320, an electrode 325, a swirl ring 330, and a shield 335, and a retaining cap 340. Different consumable configurations are known to those of skill in the art, and the configuration used can vary based on the application, type of cut, type of consumables used, and type of torch. Different adapters can be used to enable different consumable combinations to be used with a single torch. In general, the electrode 325 is centrally disposed within the torch body. The nozzle 320 is captured in the torch by a retaining cap 340. The swirl ring 330 provides a gas flow passage to cool the consumables. The shield 335 prevents molten spatter from damaging the plasma arc torch and the other plasma arc torch consumables. In some embodiments, the body of the plasma arc torch adapter 205 has a starting mechanism, for example a spring 360, for contact starting a plasma arc.

The adapter 205 can also include a second connector 311 at the second end of the body of the adapter 205 for passing a gas output (e.g., through gas tub 230) and a cutting current to the plasma torch consumables 305). The second connector 311 can establish a mounting location (e.g., the second mounting location 145 of FIG. 1) in a spaced relationship relative to the first connector (e.g., the second mounting location 145 is adjacent to the second connector 140 of FIG. 1).

Figure 4:
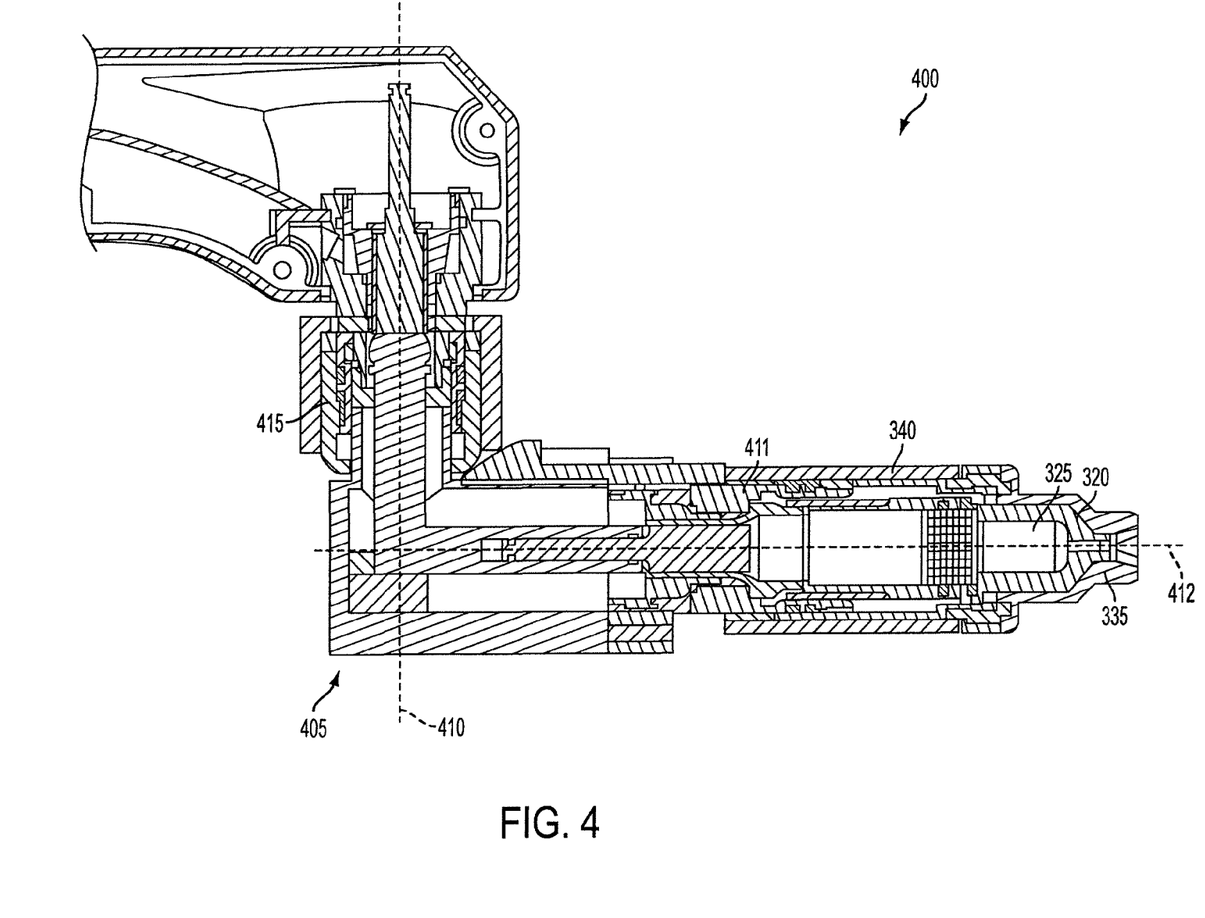
FIG. 4 is a cross sectional view of a plasma arc torch adapter positioned at a 90° angle, according to an illustrative embodiment of the invention.

The plasma torch adapter 405 can be flexible or positionable. FIG. 4 is a cross sectional view of a plasma torch system 400 including a plasma arc torch adapter 405 positioned at a 90° angle, according to an illustrative embodiment of the invention. The plasma torch adapter 405 can be positioned at an angle of about 90° relative to a central axis 410 of the first connector 415. For example, a central axis 412 of the second connector 411 can be located at an angle of about 0° to about 180° relative to a central axis 410 or the first connector 415. In some embodiments, the angle of the plasma torch adapter 405 is fixed, while in other embodiments, the plasma torch adapter 405 is positionable at an angle of about 0° to about 180° relative to a central axis 410 of the first connector 415.

The 90° angle of the plasma arc torch adapter offers several benefits. For example, this arrangement can be easier to make and have fewer moving parts than plasma torch adapters at other angles. In addition, the plasma arc torch adapter can be configured to work with both stationary power contact technology and plunger designs.

In some embodiments, the adapter can be positioned at an angle of about 180° (not shown) relative to a central axis 410 of the first connector 415. In this embodiment, the plasma torch adapter 405 can resemble a "U" either forming a curved, semi-circular shape or having two 90° bends. This configuration can be used when the area that needs to be cut or marked is in a hard to reach area.

Having a flexible or positionable plasma torch adapter 405 can allow the user to position the plasma arc torch at any angle necessary to make a cut or mark. The user can create multiple bends in the adapter 405, as describe with respect to the "U" shaped positioning described herein. A long adapter (e.g., a 12 inch adapter) can be capable of maintaining multiple bends while a shorter adapter (e.g., a 1 inch adapter) can be capable of maintaining only a single bend.

However, the ability to position the adapter at any angle between about 0° to about 90° or 180° relative to a central axis 410 of the first connector 415 can allow the operator to customize the angle based on the application. The flexibility of the plasma arc torch adapter can allow the adapter to be used in a wide variety of applications.

Referring back to FIGS. 2 and 3, the plasma arc torch adapter 205 can have an outer sleeve 240 and a wave spring (not shown) installed between the outer sleeve 240 and the torch body. This configuration can allow the existing torch cap sense (not shown) to be used with the adapter 205. The wave spring can hold the outer sleeve 240 in a normally safe portion away from the cap sense switch. When the consumable set 305 is fully installed, the outer sleeve 240 can be forced back, activating the cap sense switch. In some embodiments, the outer sleeve 240 can be replaced with an inner rod (not shown) that can translate the motion to a small ring at the torch end (e.g., the first end 130 of FIG. 1) of the adapter.

Figure 5A:
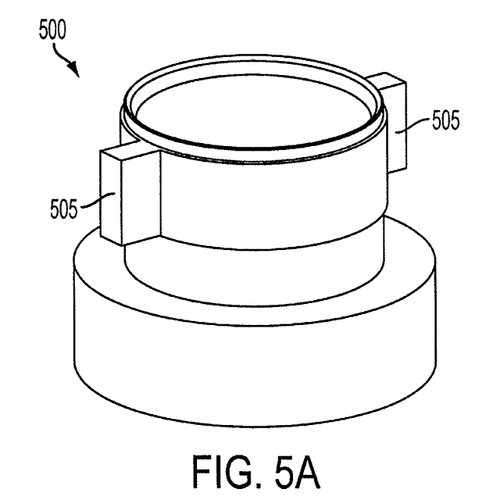
FIG. 5A is side view of an adapter retaining cap, according to an illustrative embodiment of the invention.
Figure 5B:
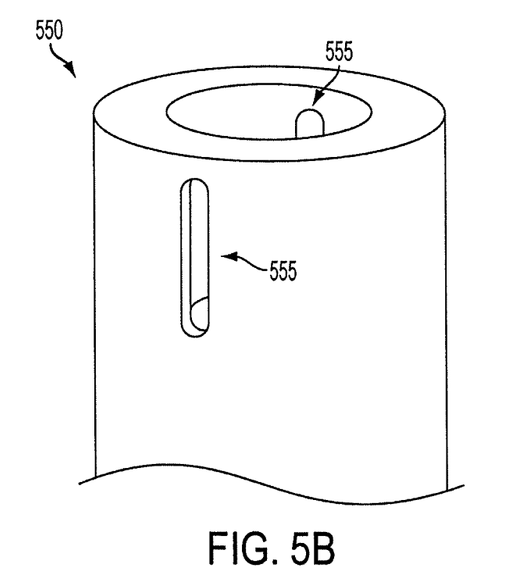
FIG. 5B is a side view of an outer insulating sleeve with translation coupling features, according to an illustrative embodiment of the invention.

FIG. 5A is side view of an adapter retaining cap 500, according to an illustrative embodiment of the invention. FIG. 5B is a side view of an outer insulating sleeve 550 with translation coupling features 555, according to an illustrative embodiment of the invention. The adapter retaining cap 500 includes coupling features 505. The coupling features 505 can mate with the translation coupling features 555. The adapter retaining cap 500 can be secured to the torch. The outer sleeve 550 of the adapter can be locked rotationally to the adapter retaining cap when the coupling features 505 and translation coupling features 555 are mated. This prevents rotation of the adapter relative to the torch. However, the outer sleeve 550 can be allowed to move axially because the coupling features 505 have a smaller length than coupling features 555. The coupling features 505, 555 allow the outer sleeve 550 of the adapter to be threaded on without preventing axial translation.

The adapter retaining cap 500 and outer insulating sleeve 550 can allow the original cap sensing switch of the plasma arc torch to be used. When the consumable set is not properly secured to the plasma torch adapter, the outer insulating sleeve does not activate the cap sensing switch. However, when the consumable set is properly secured to the plasma torch adapter, the outer sleeve translates and engages the cap sensing switch. The cap sensing switch signals the plasma arc torch that it is safe to initiate the plasma arc.

The cap sensing switch is one example of a sensor that can be used on a plasma arc torch. Other sensors can be employed to ensure that the plasma arc torch is safe to operate or to measure other parameters of the plasma arc torch. Different mechanical, electrical, or pneumatic sensors can be employed on the plasma arc torch or on the adapter. Referring to FIG. 1, the adapter 105 may continue the functionality of the sensor from the consumable interface 120 to second connector 140. Thus the safety features present in the plasma torch 110 can be relocated to the adapter 105. Alternatively, sensors can be included in the adapter 105, which are not already present in the plasma torch 110 to provide additional safety features or additional functions not present in the native torch 110.

For example, the cap sensing switch can be a sensor that prevents operation of the torch if a consumable or consumable set it not mounted at the mounting location (e.g., the mounting location 145 of FIG. 1). In some embodiments, the sensor is not part of the original torch and is incorporated into the adapter. The sensor can pass through the body of plasma torch adapter. For example, still referring to FIG. 1, the sensor can pass from the first end 130 of the generally longitudinal body 125 to the second end 135 of the generally longitudinal body 125. A mechanical or electrical sensor can be used.

In some embodiments, the adapter 105 includes an adapter sensor mechanism (not shown) that relocates a functionality of a torch sensor (not shown) to the second mounting location 145 of the adapter 105. For example, the torch sensor mechanism can be a button that is located at the consumable interface 120 of the plasma arc torch 110. The functionality of the button (e.g., its ability to detect when a consumable is properly mounted at the mounting location 121), can be moved to the adapter 105 by employing, for example, a translating rod (not shown). The translating rod can span the entire length of the adapter 105, for example, from the first end 130 to the second end 135 of the adapter 105. When the translating rod is depressed at the second mounting location 145 by a consumable or consumable set 115, the rod also depresses the sensing button at the consumable interface 120 of the plasma arc torch 110. In this way, the functionality of the adapter sensor mechanism can be relocated from the consumable interface 120 of the plasma arc torch 110 to the second mounting location 145 of the adapter 105.

In some embodiments, the adapter 105 can receive external inputs, such as a secondary gas input (not shown), to provide to the consumable set 115. This can be accomplished by providing a gas connector on the exterior of the body 125 of the adapter 105 and providing two gas connectors through the interior of the body 125 of the adapter 105. This can allow a plasma arc torch that is designed to operate with a single gas to operate with two or more gasses. For example, a plasma arc torch that is designed to operate with a single gas uses the same type of gas for plasma and shield gas. By providing a gas connector on the exterior of the body of the adapter, the same plasma arc torch that was originally design to operate with a single gas, can operate with two or more gases. The gas connector can allow the torch to use a first type of gas as a plasma gas and a second type of gas a shield gas. Further, providing a gas connector on the exterior body of the adapter can allow the plasma gas to be changed rapidly from one type of gas to another type of gas.

The adapter can also include flow restricting mechanisms to change or alter the gas flow as it passes through the adapter. For example, the flow restricting mechanisms can increase or decrease the gas flow depending on the operating parameters or cutting applications. Additionally, circuitry may be included in the adapter which can likewise change or adjust the cutting current as it is conveyed through the adapter.

Figure 6:
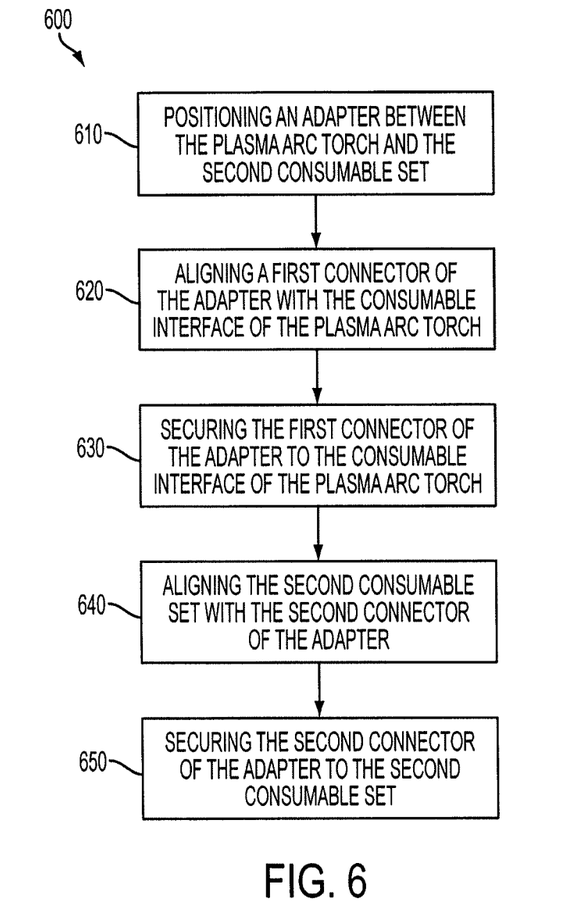
FIG. 6 is a flow chart of a method of modifying a plasma arc torch, according to an illustrative embodiment of the invention.

In another aspect, the invention features a method of modifying a plasma arc torch. FIG. 6 is a flow chart 600 of a method of modifying a plasma arc torch, according to an illustrative embodiment of the invention. The plasma arc torch receives a first plasma arc consumable set that has a first mounting topology. The plasma arc torch is modified to receive a second consumable set having a second mounting topology.

The method includes positioning an adapter between the plasma arc torch and the second consumable set (step 610). The adapter can extend the length, reach, and angle of the plasma arc torch. The adapter is connectable to a consumable interface of the plasma arc torch, for example, the adapter the consumable interface 120 of FIG. 1. A first connector of the adapter is aligned with the consumable interface of the plasma arc torch (step 620). The first connector of the adapter is secured to the consumable interface of the plasma arc torch (step 630).

The method also includes aligning the second consumable set having the second mounting topology with the second connector of the adapter (step 640). The second connector of the adapter is secured to the second consumable set (step 650). In some embodiments, the order of the steps can vary, for example, the consumable set can be aligned and secured to the adapter (steps 640, 650) before or after the first connector is aligned and secured with the consumable interface of the plasma arc torch (steps 620, 630).

In some embodiments, the method also includes removing the first consumable set having the first mounting topology from the first consumable interface of the plasma arc torch.

In some embodiments, the first consumable set and the second consumable set have the same mounting topologies. In this embodiment, the adapter is an extender that can receive the same mounting topology on the first and second connectors.

While the invention has been particularly shown and described with reference to specific preferred embodiments, it should be understood by those skilled in the art that various changes in form and detail may be made therein without departing from the spirit and scope of the invention as defined by the following claims.

What is claimed is:

1. A plasma torch adapter for relocating a mounting location of plasma torch consumables with respect to a plasma arc torch, configured to be mounted between a plasma arc torch and the plasma torch consumables and connectable to a consumable interface of the plasma arc torch, the plasma torch adapter comprising:
   a generally longitudinal cylindrical body including a first end and a second end;
   a first connector at the first end of the body, the first connector adapted to mate with the consumable interface of the plasma arc torch; and
   a second connector at the second end of the body for mating with a set of plasma torch consumables, such that a mounting location for consumables is extended in a spaced relationship relative to the first connector along a longitudinal axis of the cylindrical body of the adapter, the mounting location adjacent the second connector.

2. The plasma torch adapter of claim 1 wherein the consumable interface accommodates consumables having a first mounting topology and the second connector accommodates consumables having a second mounting topology.

3. The plasma torch adapter of claim 1 further comprising a sensor that detects the presence of consumables mounted at the second mounting location.

4. The plasma torch adapter of claim 1 further comprising an adapter sensor mechanism that relocates a functionality of a torch sensor to the mounting location of the adapter.

5. The plasma torch adapter of claim 1 wherein the first connector receives a first set of functionalities from the plasma arc torch and the second connector transmits a second set of functionalities to the set of plasma torch consumables, the second set of functionalities including at least the first set of functionalities.

6. The plasma torch adapter of claim 1 wherein the first connector receives a first set of functionalities from the plasma arc torch and the second connector transmits a second set of functionalities to the set of plasma torch consumables, the second set of functionalities does not include all functionalities of the first set of functionalities.

7. The plasma torch adapter of claim 1 wherein the body contains at least two electrical paths from the second end of the body to the first end of the body.

8. The plasma torch adapter of claim 1 wherein a gas flow of the plasma arc torch is modified by the plasma torch adapter.

9. The plasma torch adapter of claim 1 wherein the body has a starting mechanism for contact starting a plasma arc.

10. The plasma torch adapter of claim 1 wherein the body is at least one of flexible or positionable.

11. The plasma torch adapter of claim 1 wherein the second connector is configured to connect to a second plasma torch adapter.

12. The plasma torch adapter of claim 1 wherein the plasma arc torch is a handheld plasma arc torch.

13. The plasma torch adapter of claim 1 wherein the consumable interface and the second connector are complementary.

14. The plasma torch adapter of claim 1 wherein the adapter is securable to the consumable interface to prevent rotation of the adapter relative to the torch.

15. The plasma torch adapter of claim 1 wherein the adapter has a gas input separate from a gas input from the plasma arc torch.

16. The plasma torch adapter of claim 1 wherein the plasma torch consumables and the set of plasma torch consumables are the same.

17. A plasma torch adapter for extending a plasma arc torch, configured to be mounted between the plasma arc torch and plasma torch consumables, the plasma torch adapter connectable to a consumable interface of the plasma arc torch and comprising:
   a generally longitudinal cylindrical body including a first end and a second end;
   a first connector at the first end of the body, the first connector adapted to receive a gas input and cutting current from the plasma arc torch; and
   a second connector at the second end of the body for passing a gas output and a cutting current to plasma torch consumables, such that a mounting location for the consumables is extended in a spaced relationship relative to the first connector along a longitudinal axis of the cylindrical body of the adapter, the mounting location adjacent the second connector.

18. The plasma torch adapter of claim 17 wherein the body comprises a starting mechanism for contact starting a plasma arc.

19. The plasma torch adapter of claim 18 wherein the starting mechanism includes a spring.

* * * * *